US008155050B2

(12) United States Patent
Lloyd et al.

(10) Patent No.: US 8,155,050 B2
(45) Date of Patent: Apr. 10, 2012

(54) SATELLITE COMMUNICATIONS INTEROPERABILITY MODULE

(75) Inventors: Paul Gareth Lloyd, Duesseldorf (DE); Ronald P. A. Schiltmans, Toenisvorst (DE); Jonathan Walker, Nr Hungerford (GB)

(73) Assignee: Raven Manufacturing Limited, Altham Hyndburn (GB)

( * ) Notice: Subject to any disclaimer, the term of this patent is extended or adjusted under 35 U.S.C. 154(b) by 468 days.

(21) Appl. No.: 12/527,804

(22) PCT Filed: Feb. 19, 2008

(86) PCT No.: PCT/US2008/054280
§ 371 (c)(1),
(2), (4) Date: Aug. 19, 2009

(87) PCT Pub. No.: WO2008/103656
PCT Pub. Date: Aug. 28, 2008

(65) Prior Publication Data
US 2010/0097980 A1  Apr. 22, 2010

Related U.S. Application Data

(63) Continuation-in-part of application No. 11/779,402, filed on Jul. 18, 2007.

(60) Provisional application No. 60/890,533, filed on Feb. 19, 2007.

(51) Int. Cl.
H04B 7/185 (2006.01)
(52) U.S. Cl. ........................................... 370/316
(58) Field of Classification Search ............ 370/316
See application file for complete search history.

(56) References Cited

U.S. PATENT DOCUMENTS

| | | | |
|---|---|---|---|
| 4,796,032 A | 1/1989 | Sakurai et al. | |
| 5,671,220 A | 9/1997 | Tonomura | |
| 5,995,812 A | 11/1999 | Soleimani et al. | |
| 6,366,620 B1 | 4/2002 | Jackson et al. | |
| 6,763,222 B1 | 7/2004 | Bukhari | |
| 6,781,968 B1 * | 8/2004 | Colella et al. | 370/316 |
| 6,836,515 B1 | 12/2004 | Kay et al. | |
| 6,871,053 B2 | 3/2005 | Shibuya et al. | |
| 6,934,512 B2 | 8/2005 | Meirzon et al. | |

(Continued)

OTHER PUBLICATIONS

International Preliminary Report on Patentability for counterpart application No. PCT/US2008/054280. Issued on Aug. 27, 2009 by The International Bureau of WIPO, Geneva, Switzerland.

*Primary Examiner* — Kenny Lin
(74) *Attorney, Agent, or Firm* — Babcock IP, PLLC

(57) ABSTRACT

A satellite communications interoperability module and method for frequency down-conversion. The module insertable in-line with an intra-facility link communicating a multiplexed signal between the outdoor unit (ODU) and the indoor unit (IDU). Electrical circuitry of the module transforming and forwarding the multiplexed signal over the intra-facility link, the multiplexed signal including at least direct current, a standard tone, and L-band data signals. Switching means of the module specifies operations performed by the electrical circuitry to transform the multiplexed signal frequencies, waveforms and voltages according to predetermined parameters compatible between the ODU and the IDU. An interoperability method for compatibility with a range of different indoor units applied by the interoperability module and or incorporated into an integral ODU is application of a second frequency shift upon the L-band signal output from the ODU primary down-conversion circuit.

20 Claims, 9 Drawing Sheets

U.S. PATENT DOCUMENTS

| | | |
|---|---|---|
| 7,050,765 B2 | 5/2006 | Ammar et al. |
| 7,076,201 B2 | 7/2006 | Ammar |
| 7,099,347 B2 | 8/2006 | Kita |
| 7,756,490 B2 * | 7/2010 | Karabinis ................... 455/95 |
| 2002/0119797 A1 | 8/2002 | Woodhead et al. |

* cited by examiner

| NAME | RF INPUT / GHz | | 1ST LO | 2ST LO | EFFECTIVE LO | IFF OUTPUT / MHz | |
|---|---|---|---|---|---|---|---|
| | LOW | HIGH | | | | LOW | HIGH |
| US DOMESTIC | 11.70 | 12.20 | 10.60 | 2.55 | 13.15 | 950 | 1450 |
| EURO- LOW | 10.95 | 11.45 | 9.75 | 2.65 | 12.40 | 950 | 1450 |
| — | 11.70 | 12.45 | 10.60 | 2.80 | 13.40 | 950 | 1700 |
| UNIVERSAL LOW | 10.70 | 11.70 | 9.75 | 0.00 | 9.75 | 950 | 1950 |
| UNIVERSAL HIGH | 11.70 | 12.75 | 10.60 | 0.00 | 10.60 | 1100 | 2150 |
| — | 11.20 | 11.70 | 9.75 | 2.90 | 12.65 | 950 | 1450 |
| EURO- HIGH | 12.25 | 12.75 | 10.60 | 3.10 | 13.70 | 950 | 1450 |

FIG. 6

SATELLITE COMMUNICATIONS INTEROPERABILITY MODULE

CROSS REFERENCE TO RELATED APPLICATIONS

This application claims the benefit of U.S. Provisional Patent Application No. 60/890,533, titled "VIM and FReD VSAT Interoperability Modules", filed Feb. 19, 2007 by Paul Gareth Lloyd and Ronald P. A. Schiltmans and U.S. Utility patent application Ser. No. 11/779,402, titled Satellite Communications Interoperability Module and Down-Conversion Method by Paul Gareth Lloyd and Ronald P. A. Schiltmans.

BACKGROUND

The invention relates to satellite communications interoperability modules and Down-Conversion methods. More particularly the invention relates to a satellite communications interoperability module to enable inter-connection and operation of diverse Indoor Unit (IDU) and Outdoor Unit (ODU) satellite communications system components and services.

Very Small Aperture Terminal (VSAT) Satellite Communication Systems are becoming increasingly common, for example, for broadband internet communications and Direct To Home (DTH) entertainment services. There are multiple standards available, requiring dedicated equipment designed to provide the specified signal parameters of each standard.

A VSAT network comprises a plurality of terminals. These terminals are designed to handle varying outbound data-rates and bandwidths (to divide the quasi-fixed and finite satellite capacity amongst the plurality of terminals, making maximum use of the satellite capacity). The data-rate requirement differs according to the application. Some applications utilize low data-rate, but "always-on" single channel per carrier (SCPC). Other applications may utilize high data-rates, in intermittent bursts, for example, internet access via satellite.

A VSAT system includes an ODU mounted at an outside location with a line of sight to the target satellite(s). The ODU typically includes a transceiver coupled to a Low Noise Block (LNB) that illuminates a reflector dish to beam signals between the ODU and target satellite(s). The ODU transceiver inputs and outputs are coupled via an Intra-Facility Link (IFL) to the IDU, which operates as a modem, transferring the desired data from the ODU to consumer terminals such as audio-visual equipment and or personal computers.

The IFL typically consists of a separate transmit and receive cable. While the satellite communication may take place at C-, Ku- or Ka-frequency bands, information and power is passed between the IDU and ODU over the IFL in a frequency multiplexed manner.

A typical IFL signal package includes DC power (whose voltage level may be used to provide a polarization selection control signal), a 22 kHz tone (for carrying sub-band selection) and an L-band data signal (a frequency shifted version of the desired, higher frequency, satellite signal). Some IDU also provide a high quality (i.e. stable) local oscillator (LO) reference signal (typically at 10 MHz) to the ODU, whereas most IDU do not.

Lower data-rates (including SCPC) typically occupy lower bandwidths. Modems operating at lower data-rates are required to "find" the desired signal in amongst a plurality of other signals. Hence, lower data-rate applications require (amongst other parameters) greater frequency stability from the LO (local oscillator), a key subsystem in the LNB. Network designers may specify a minimum level of stability from the LNB for a given terminal, according to the lowest data-rate required. The cost of the frequency reference is exponentially proportional to it's stability, and the stability is a function of the temperature range over which it is specified for operation. The ODU is typically required to operate in the temperature range −40 C to +55 C, whereas the IDU operates typically between 0 C and +40 C.

A further problem is that a VSAT modem is designed to receive only a fraction of the total bandwidth available from the satellite. For VSAT applications in the Ku-band for example, the IDU receives only 500 MHz of the 2000 MHz wide Ku-band. The LNB LO frequency is responsible for selecting which sub-band of the Ku-outbound channel is passed to the IDU.

Previously, a range of similar VSAT components, differentiated for example by locating the frequency reference in the IDU or ODU and having different specific frequency and stability specifications therefore, have been available at corresponding price levels, complicating design marketing, logistics and support issues for equipment manufacturers. Interoperability and regional frequency regulations are another significant limitation. For example, some existing IDU and ODU combinations fail to utilize high quality reference signals generated by the IDU, substituting a lower quality reference signal generated in the ODU. These various issues require an equipment provider to design, forecast and stock LNBs capable of accommodating several different channels/LO frequencies and several different input/output frequencies.

A highly integrated and cost efficient modular component developed for the ODU is the Fully Integrated Mixer Oscillator Down-converter (FIMOD). As shown in FIG. 1, one embodiment of the FIMOD is capable of performing PLL (phase locked loop) functionality, switched between two LO frequencies, KU-low 10.70-11.70 GHz and KU-high 11.70-12.75 GHz, to enable full-band, Phase Locked Loop (PLL) receivers in VSAT outbound/downlink terminals with improved electrical performance and cost efficiency. However, limitations in existing FIMOD based ODU, along with a lack of Intermediate Frequency (IF) bandwidth/performance from many existing IDU limits commercial acceptance of the FIMOD based ODU.

A typical FIMOD ODU operates with LO frequencies of 9.75 and 10.60 GHz. However, for many standardized VSAT communication system configurations, it is desirable to switch between three frequencies; 10.00 GHz, 10.75 GHz and 11.30 GHz. Because a typical FIMOD ODU is not able to switch between three frequencies or generate the 11.30 GHz frequency, interchangeable use of the FIMOD type ODU with these existing IDU/VSAT communications systems is prevented.

The specifics of the FIMOD ODU are presented herein for example purposes, other ODU and IDU combinations present similar compatibility problems, requiring equipment manufacturers to design, manufacture, inventory and support a large number of IDU and or ODU models specifically configured for each possible combination.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with the general and detailed descriptions of the invention appearing herein, serve to explain the principles of the invention.

FIG. 6 is a table demonstrating an exemplary frequency plan for a VIM.

DETAILED DESCRIPTION

The inventors have recognized that communications equipment manufacturers desire improved electrical performance from standardized equipment, to simplify product lines and reduce costs. A VSAT Installation Module (VIM) and or Frequency Reference Device (FReD) according to the invention may be installed in-line with the IFL, between the IDU and ODU, either separately or together to enable improved electrical performance and the interconnection/configuration of a wide range of different ODU and IDU equipment that are otherwise incompatible. Alternatively, a series LO down conversion protocol incorporating circuit elements described herein may be implemented to provide multiple band capability/IDU compatibility, for example into a single "universal compatibility" integral ODU.

Because the sub-bands over which the KU-band receive are divided, without straddling 11.70 GHz and most IDU are capable of handling inverted spectra it is possible to generate signal conversion protocols with respect to the capabilities of, for example, a FIMOD based ODU by selecting either the high or low band output of the FIMOD LO and routing it through an additional mixing stage fed by a second LO to generate the sub bands compatible with the desired IDU.

Figure 2:
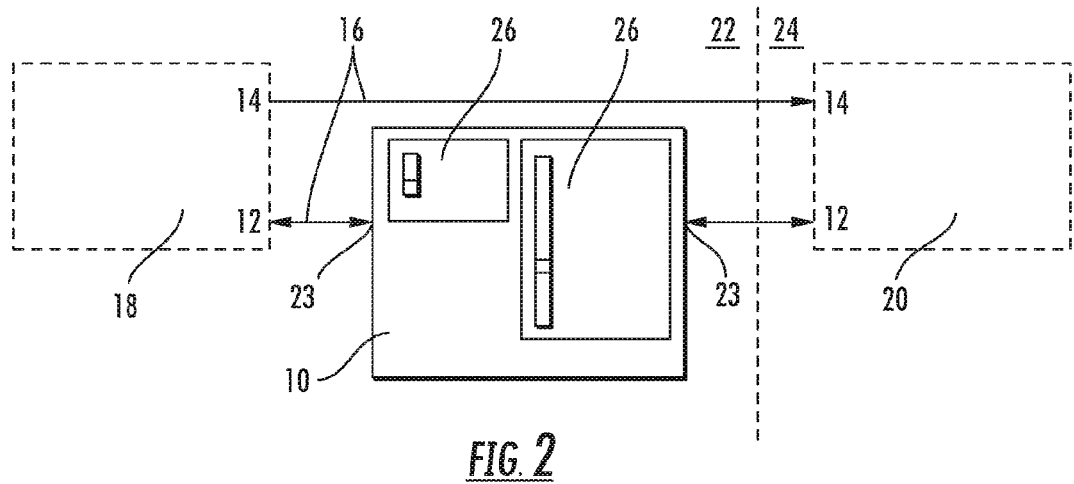
FIG. 2 is a schematic view of a VIM positioned in-line between an IDU and an ODU, on the receive signal path.

As shown for example in FIG. 2, the VIM 10 is preferably an electronic, 2 port network with an additional quasi-static user interface configurable during installation. The VIM 10 may be installed in-line with the downlink path 12 and or outbound path 14 of the IFL 16, between the IDU 18 and the ODU 20. The VIM 10 may be positioned indoors 22 or outdoors 24, but typically is located indoors to minimize environmental sealing requirements and exposure to performance degrading temperature extremes. The VIM 10 may be configured as a self contained "dongle" type of accessory module, with input and output port(s) 23 for interconnection with the ends of a break in the IFL 16 or between the IDU 18 and the IFL 16. Configuration is via one or more switches and or a switch means 26 in a quasi-static user interface to specify signal transformation parameters. Alternatively, the VIM 10 functionality may be incorporated directly into the ODU 20. The switch means 26 may be any manner of switch apparatus such as a plurality of jumpers, dip switches, slide switches, rotary switches, toggle switches or the like. The switch means 26 may be configured to designate signal transformation parameters, such as, the polarization 27 and or a desired LO frequency 25, such as 9.75, 10.00, 10.25, 10.60, or 11.30 GHz. Alternatively, the switch means 26 may be a further circuit that is either electronically programmable via commands over the IFL, or auto configuring according to an analysis of IDU responses to test configurations.

Figure 3:
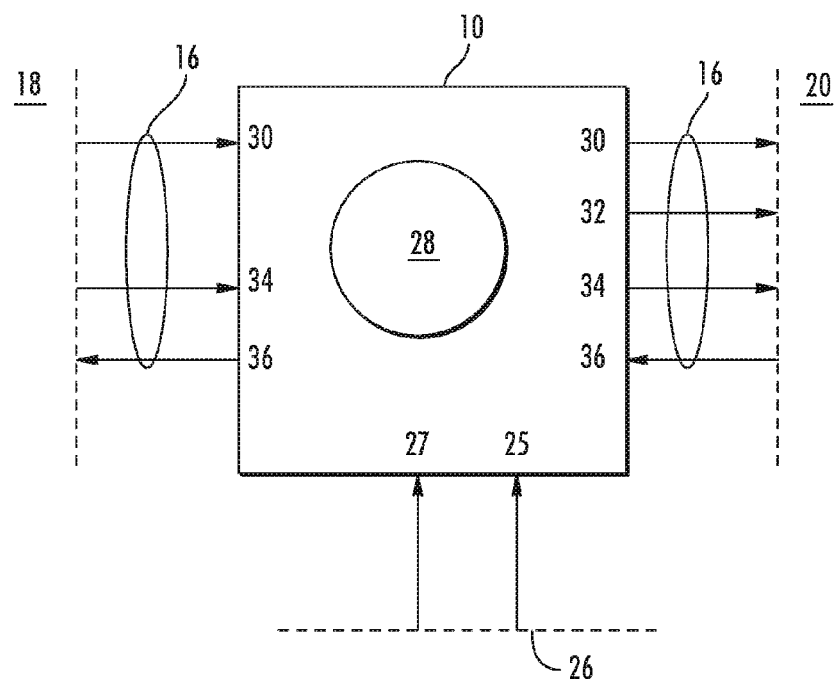
FIG. 3 is a schematic view of exemplary Switching Means configuration signals and elements of multi-plexed signals passing along the IFL to and from the VIM port(s).

An exemplary version of the VIM 10 contains electronic circuitry 28 comprising a PLL, Voltage Controlled Oscillator (VCO) 29, frequency reference, 22 kHz tone generator, a voltage variable power supply, a simple microprocessor and additional interconnecting, monitoring, power and or control circuits. As shown in FIG. 3, the frequency multiplexed signal elements passing through the IFL 16, to the VIM 10 port(s) 23 carry both power and data signals at Direct Current (DC) 30, a standard tone 32, for example 22 kHz (a standard tone/information carrier frequency in the field of the invention), a reference frequency 34, for example 10 MHz and L-band 36, typically 1-2 GHz. The VCO 29 and mixer circuits that apply the selected frequency of the VCO 29 to the L-Band 36 may be incorporated into, for example, a single chip LO integrated circuit, for example the "SaTCR-1" integrated circuit by ST Microelectronics of Geneva, Switzerland, of the electronic circuitry 28. By passage through the VIM 10 and according to the selected settings of the configuration switches and or switch means 26, the DC 30, and L-band 36 voltages and frequencies are adjusted to harmonize the signal characteristics between the selected IDU 18 and ODU 20.

Figure 4:
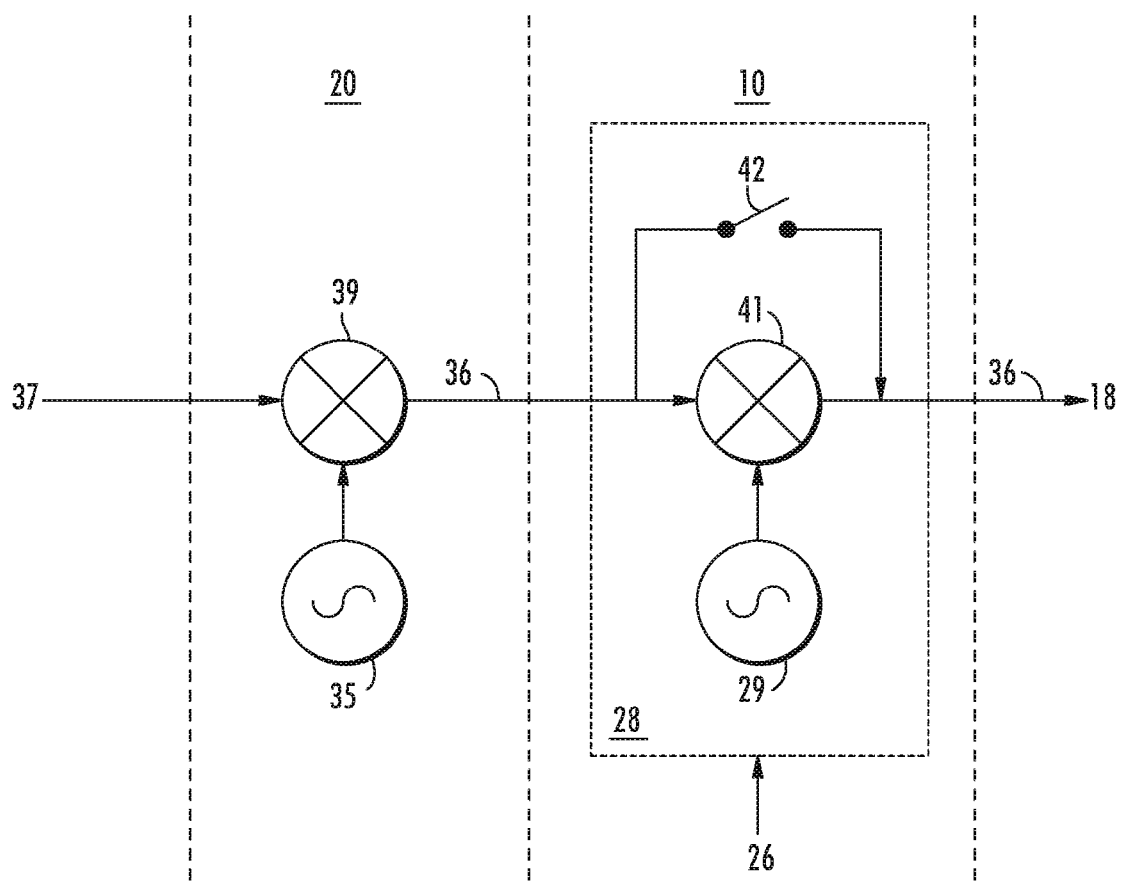
FIG. 4 is a signal diagram exemplary of the secondary down-conversion performed upon the L-band according to the switching means input

As shown in FIG. 4, the ODU 20 outputs an L-band 36 component of the multiplexed signal onto the IFL 16 that is a frequency down-converted version of the data signal from the satellite 37, the down-conversion of the satellite 37 signal performed by the first LO 35 and a first mixer 39 of the ODU 20. Where the ODU 20 has dual band capability, such as the FIMOD ODU 20, the ODU 20 can be configured to output the L-band 36 at either the low or high band (see FIG. 1). The PLL and VCO 29 of the VIM 10 electrical circuitry 28 then operate upon the L-band 36 as a second frequency conversion stage via a second mixer 41 to adjust the L-band 36 to a desired L-band 36 sub-band compatible with the IDU 18 for example according to FIGS. 6 and 7, as described herein below.

Figure 11:
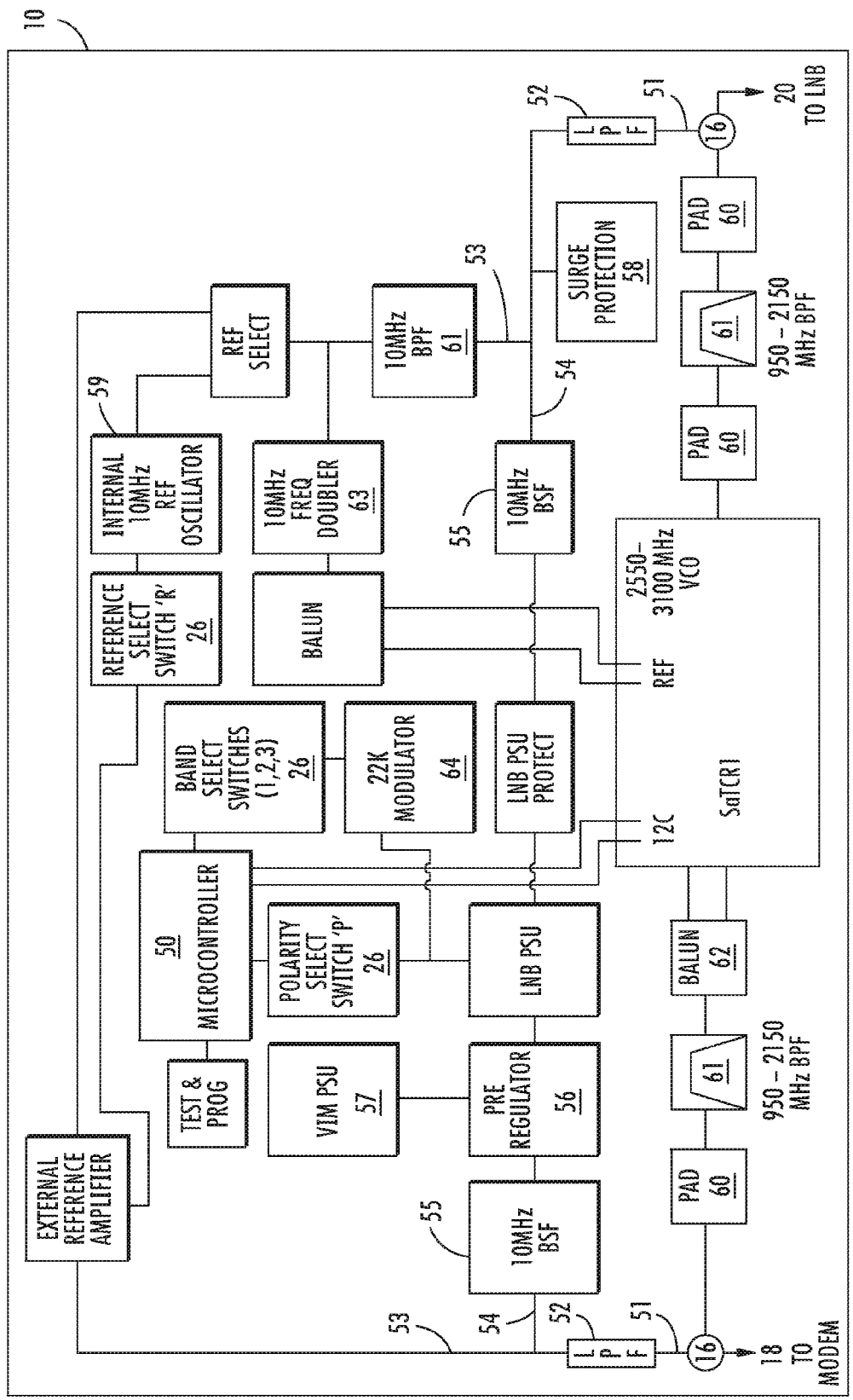
FIG. 11 is a block circuit diagram of an exemplary embodiment of a VIM.

An exemplary embodiment of the VIM 10 internal circuit interconnections with respect to the single chip LO integrated circuit, for example a SatCR-1, providing the VCO 29 and second mixer 41 functionality is shown in FIG. 11. Although the SatCR-1 is marketed as a single chip broadband down-converter for integration within the LNB circuits of an ODU 20 for generation of the L-Band 36 output of the ODU 20, the inventors have recognized that the control instructions supplied to the on-chip PLL controlled VCO 29 from the IDU 18 to the ODU 20 (assuming the units are frequency band and polarity compatible) can instead be provided with a range of different inputs by a microcontroller 50 of the VIM 10 via an i2C communications link capability of the SatCR-1. The microcontroller 50 receives several inputs such as the polarity and band selections of the selected switch means 26 and is programmed to output control commands (frequency and polarity selections) to the SatCR-1 which in turn drives the VCO 29 (within the SatCR-1) to supply the desired LO frequency to the second mixer 41 (also within the SatCR-1) required for generating an L-band 36 configured for any specific version of a wide range of different indoor unit(s) 18.

Within the VIM 10, a low frequency signal component bypass 51 around the SatCR-1 is coupled at indoor unit 18 and outdoor unit 20 sides of the VIM 10 IFL 16 connections, first passing at each connection through a low pass filter 52. The low frequency signal component has a further parallel circuit division into a power supply path 54 and a reference signal path 53.

The power supply path 54 has a Band Stop Filter 55 tuned to the external reference frequency (typically 10 MHz) at each end. A pre-regulator 56 delivers power to a VIM power supply 57 that in turn supplies operating power to the microcontroller, SatCR-1 and any associated logic and control subcircuits. Also, the preregulator 56 passes power upstream, to energize the outdoor unit 20. As any static discharge or other surge coming from the connection to the outdoor unit 20 can be expected to be of low frequency, a surge protection 58 circuit may be included, for example placed at the outdoor unit 20 side of the bypass.

Depending upon the selected input of the switch means 26 with respect to whether or not the external reference signal or standard tone, if present, or a replacement reference signal is desired, the reference signal path 53 of the bypass provides either a full bypass of the reference signal around the SatCR-1 or a cut-off and replacement of the reference signal with a substitute reference signal generated by a dedicated oscillator 59 of the VIM 10, depending upon user inputs to the switch means 26.

Similar to the filtering applied to the bypass paths to limit the passage of only the desired signals, the input and output of the L-band 36 passing through the SatCR-1 may also be further tuned and or signal conditioned with band pass filter(s) 61, impedance matching 62 and or precision attenuator arrangement(s) 60.

A frequency doubler 63 fed by the 10 Mhz reference frequency is applied to generate and supply a 20 Mhz reference frequency to a reference input of the SatCR-1.

A 22K modulator 64 controlled by the selected switch means 26 may also be applied in embodiments for use with a FIMOD ODU 20, where this frequency is used as a control signal for configuring an oscillator present in a specific ODU 20, such as the FIMOD VCO.

Figure 5:
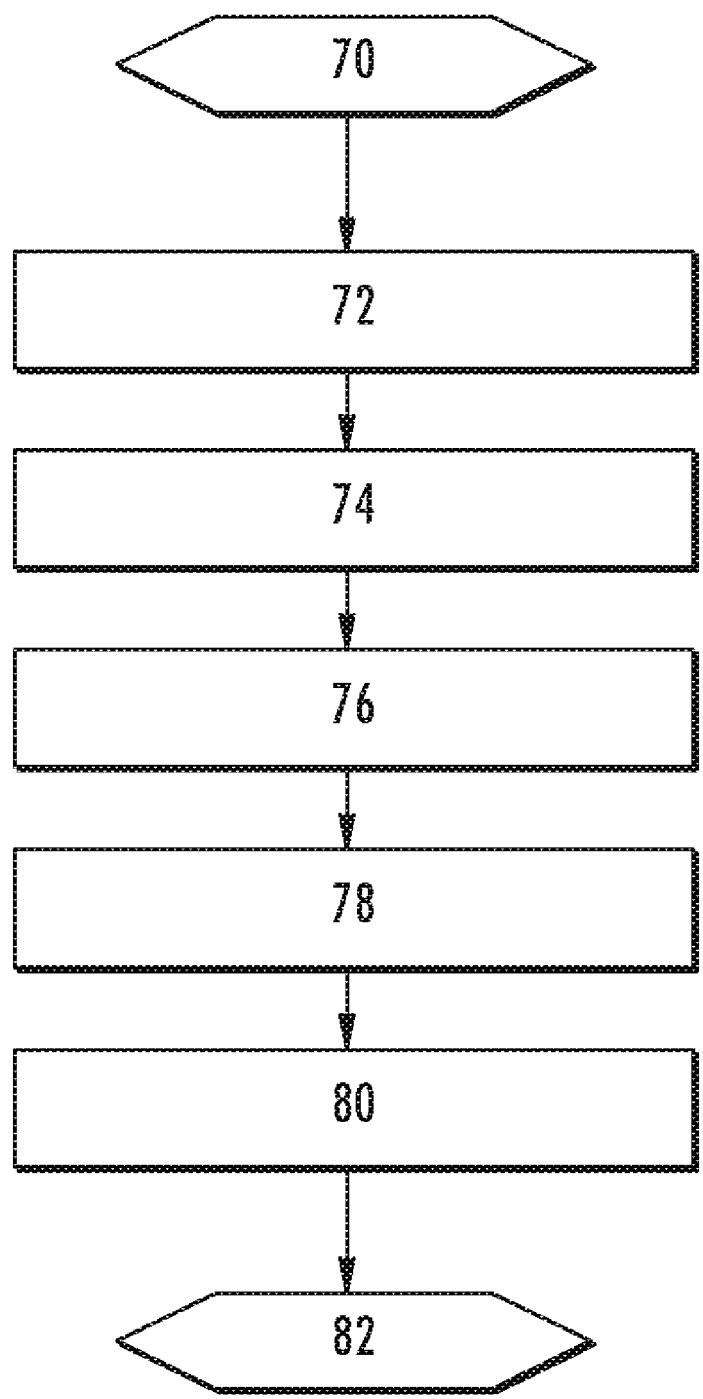
FIG. 5 is a flow chart demonstrating one embodiment of VIM configuration and operation.

An exemplary method of operation for the VIM 10 is demonstrated in FIG. 5. At start-up 70, the VIM 10 decodes the quasi-static, user selected configuration of the switch means 26. At 72, according to the switch means 26, the correct DC 30 level and standard tone 32 output to the ODU 20 may be enabled. At 74, the correct VIM 10 internal LO frequency and architecture is set to suit the applicable IDU 18/ODU 20 requirements. At 76, a check is made for the presence of a reference frequency 34, for example 10 MHz, from the IDU—and if not present, in 78, a reference frequency 34 is enabled/generated by the VIM 10 and supplied to the ODU 20. At 80, the VIM 10 is operating fully configured as a stable receiver taking the universal L-band 36 input from the ODU 20 (LNB/transceiver) and modifying the frequency band frequency limits by performing a mixing operation, filtering and inversion of the spectrum as necessary to supply the IDU with a compatible L-Band 36 signal. Once configuration is complete, VIM 10 operates transparently until powered down, for example by detection of a control signal and or direct current 30 cut-out, at 82.

The VIM 10 may be pre-configured to operate according to a wide range of known frequency plans for example as shown in FIG. 6. The tabulated figures represent the progression of the adaptive receiver architecture set up, wherein:

RF Input/GHz: The frequency range, High and Low, transmitted by the satellite and received by the ODU.

1st LO: The frequency of the LO (local oscillator) used to make the first downconversion step. According to the exemplary embodiment, this is the first LO 35 of the ODU.

2nd LO: The frequency of the second LO, VCO 29 of the VIM 10, in the second (optional) downconversion step.

Effective LO: The net effect of cascading the ODU 20 and VIM 10. Or in other embodiments, the result of the first and second LO down-conversion, that may alternatively occur in a single device, such as a "universal compatibility" ODU 20, having the functionality shown for example in FIG. 4, but with both down conversion stages resident in the ODU 20. The IDU 18 does not "know" whether one or two down-conversion steps has taken place. The "effective LO" frequency is the equivalent one step down-conversion LO frequency resulting from the selected frequencies of the first LO 35 and the VCO 29.

IF Output/MHz: The occupied bandwidth of the signal transferred from the invention output to the IDU 18. The bandwidth of the "IF Output" is the same as the "RF Input", just down-converted to the required frequency for compatibility with the selected IDU 18.

Figure 1:
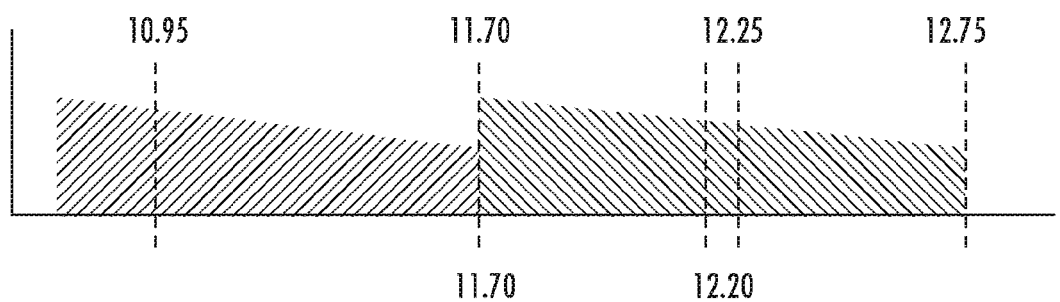
FIG. 1 is a frequency band chart for a typical FIMOD IDU.
Figure 7:
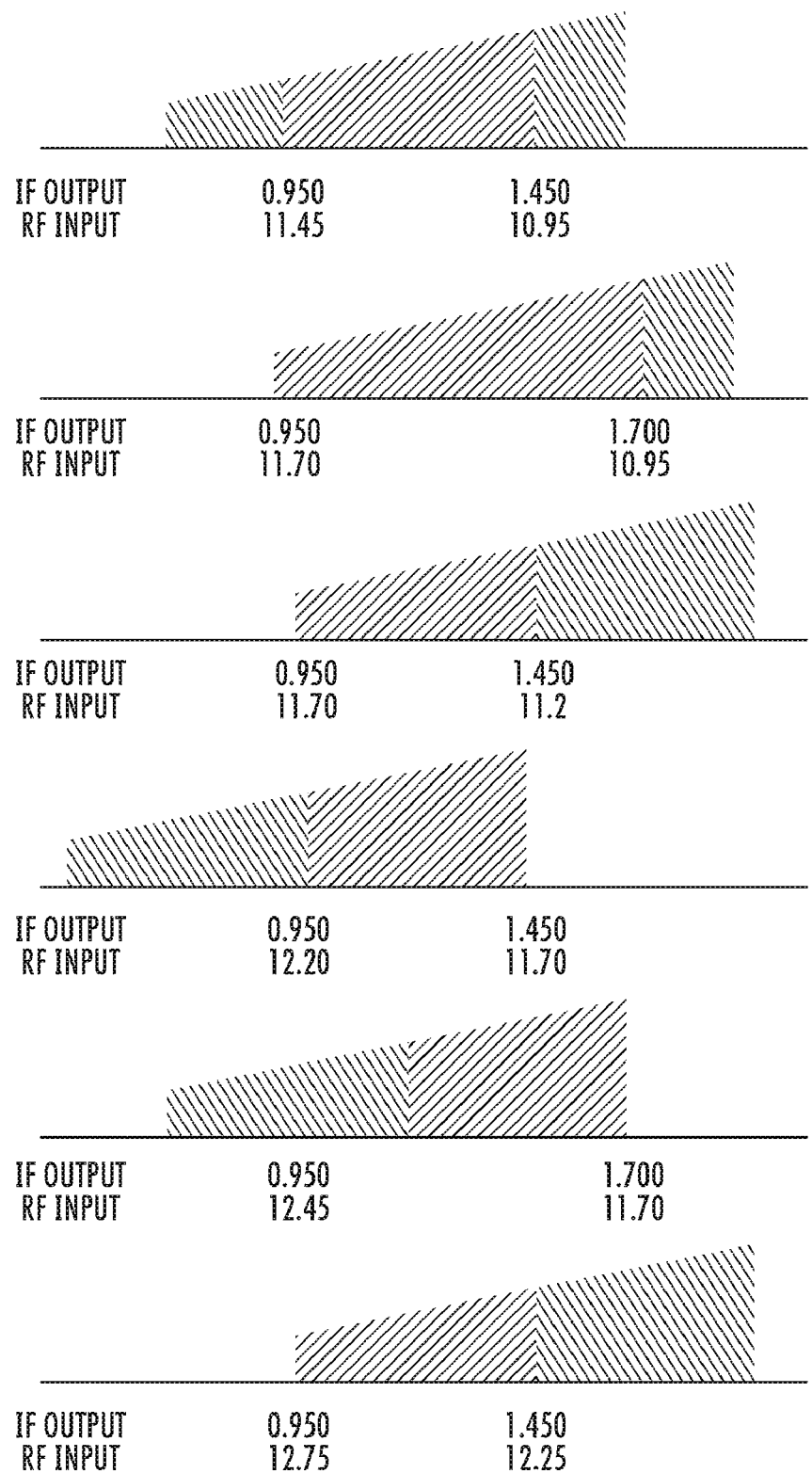
FIG. 7 is a graphical representation of the frequency plans of FIG. 6.

As shown by FIG. 7, several of the bands require inversion, the sense of spectrum is illustrated by the direction of slope. Hashed areas indicate frequencies of the coarse spectrum that are either filtered by the VIM 10 or discarded by the IDU 18. To obtain an output according to any of the other bands demonstrated in FIG. 7, or others that a specific IDU 18 may require, the VCO 29 of the electrical circuitry 28 is applied in conjunction with a mixer upon the L-band 36 component of the multiplexed signal with the second LO frequency specified by the switch means 26. The two universal KU-bands (low and high), as shown in FIG. 1, may be passed through the VIM 10 without modification, represented by bypass 42 on FIG. 4, relying upon the first LO (for example of the FIMOD ODU 20) without further manipulation via the VIM 10 VCO, that is the second LO frequency is zero or "off".

Depending upon the characteristics of the IDU 18 and or ODU 20 equipment that is being interfaced with, the extended features of the VIM 10 may not be necessary, or alternatively some features may actually conflict with several known IDU 18. In alternative embodiments, the VIM 10 may be provided with a reduced functionality, for example without the reference frequency capability. Similarly, for configurations where only a high quality reference frequency is desired a simplified embodiment of the invention, a Frequency Reference Dongle (FReD) 38 may be supplied.

Figure 8:
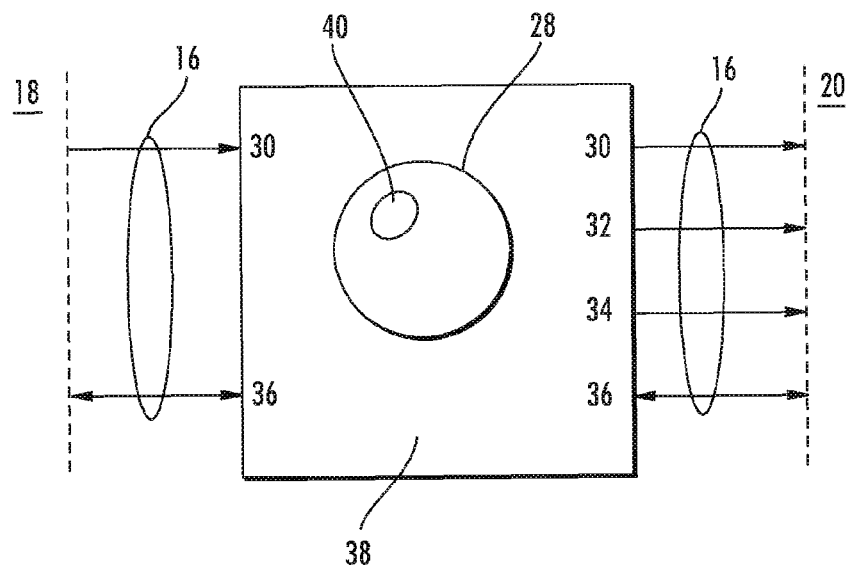
FIG. 8 is a schematic view of exemplary FReD Inputs and Outputs.
Figure 9:
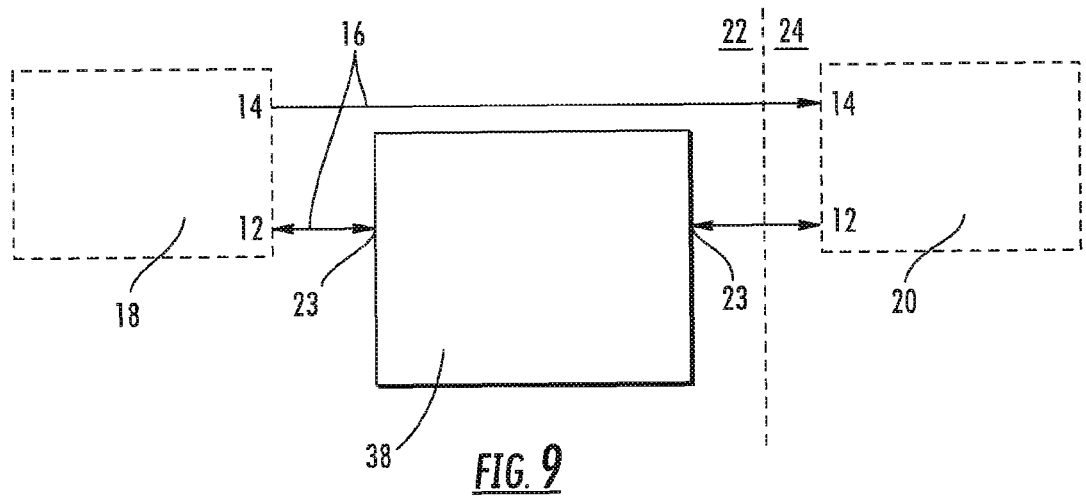
FIG. 9 is a schematic view of a FReD positioned in-line between an IDU and an ODU, on the receive signal path.
Figure 10:
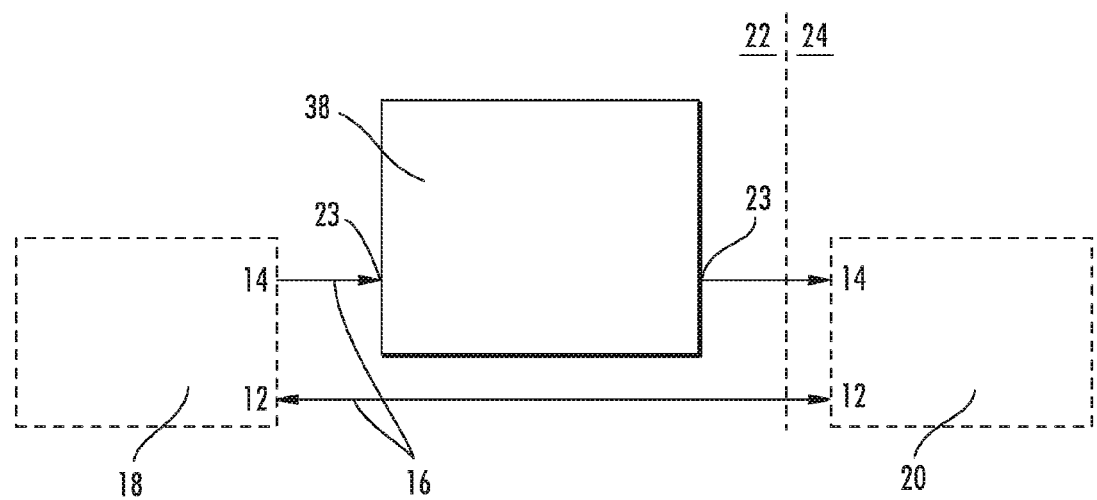
FIG. 10 is a schematic view of a FReD positioned in-line between an IDU and an ODU, on the transmit signal path.

The FReD 38 embodiment, as shown in FIG. 8, again inserted inline with the IFL 16 between the IDU 18 and the ODU 20, may be adapted to allow all signals to pass, bidirectionally, between the IDU 18 and the ODU 20. The FReD 38 electrical circuitry 28 includes a reference frequency generator sub circuit 40 that supplies a high quality reference frequency 34, for example, to the ODU 20. The reference frequency may be, for example crystal based. To prevent the opportunity for unpredictable system behavior, the reference frequency 34 generated and multiplexed into the IFL 16 by the FReD 38 may be shielded from the IDU 18. As shown in FIGS. 9 and 10, the FReD may be alternatively positioned as needed in either the downlink path 12 and or, for example where no original reference frequency is available from the IDU 18 (or the original reference frequency is of insufficient quality), in the outbound path 14. Where the original reference frequency is of insufficient quality, the FReD 38 may be configured to filter same and inject the reference frequency 34 into the IFL 16 connection to the ODU 20.

For a given frequency stability requirement, it is more expensive to realize a given stability using a reference located in the outdoor environment. The corollary of this is that a frequency reference specified over the outdoor temperature range will demonstrate much better stability when operated in the indoor environment. Therefore, the invented architecture offers higher stability systems for the same price, or the same stability for a lower cost.

One skilled in the art will appreciate that the creation of a low cost, flexible architecture in-line device, that enables use of a VSAT LNB/transceiver, such as a FIMOD ODU 20, to be used with a wide range of different IDU 18 available in the market enables significant cost and performance improvements. Replacing the, for example eight, VSAT LNB/transceiver ODU 20 configurations described herein by setting up the correct universal VSAT LNB/transceiver configuration (coarse band, polarization etc.), using standard control voltages/tones and adapting the receive architecture dynamically to create the desired emulated IF band provides significant opportunities for ODU 20 manufacturer model consolidation, inventory requirement reduction, supply logistics and field operating band re-configuration.

In still further embodiment's the electrical circuitry 28 and switch means 26 described herein may be incorporated into the ODU 20 to provide a single ODU 20 with band shifting capabilities operable in any of the, for example eight, bands shown in FIG. 6. Thereby, an ODU 20 is enabled that is interoperable with the majority of known IDU 18, but that has a total of only two LO, the FIMOD LO, and an additional, for example, SCR integrated circuit VCO incorporated within combined electrical circuitry 28.

Further, improvements in electrical performance are realized by enabling wider adoption of FIMOD ODU technology and or via the supply of an external reference with greatly improved stability.

Table of Parts

| | |
|---|---|
| 10 | VSAT Installation Module |
| 12 | downlink path |
| 14 | outbound path |
| 16 | intra-facility link |
| 18 | indoor unit |
| 20 | outdoor unit |
| 22 | indoors |
| 23 | port |
| 24 | outdoors |
| 25 | local oscillator frequency |
| 26 | switch means |
| 27 | polarization |
| 28 | circuitry |
| 29 | voltage controlled oscillator |
| 30 | direct current |
| 32 | standard tone |
| 34 | reference frequency |
| 35 | First local oscillator |
| 36 | L-band |
| 37 | satellite |
| 38 | frequency reference dongle |
| 39 | first mixer |
| 40 | reference frequency generator sub circuit |
| 41 | second mixer |
| 42 | bypass |
| 50 | microcontroller |
| 51 | bypass |
| 52 | low pass filter |
| 53 | reference signal path |
| 54 | power supply path |
| 55 | band stop filter |
| 56 | pre-regulator |
| 57 | VIM power supply |
| 58 | surge protection |
| 59 | oscillator |
| 60 | precision attenuator arrangement |
| 61 | band pass filter |
| 62 | impedance matching |
| 63 | frequency doubler |

-continued

Table of Parts

| | |
|---|---|
| 64 | modulator |

Where in the foregoing description reference has been made to ratios, integers, components or modules having known equivalents then such equivalents are herein incorporated as if individually set forth.

Each of the patents identified in this specification are herein incorporated by reference in their entirety to the same extent as if each individual patent was fully set forth herein for all each discloses or if specifically and individually indicated to be incorporated by reference.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A satellite communications interoperability module for in-line insertion with an intra-facility link communicating a multiplexed signal between an outdoor unit and an indoor unit, comprising:
   ports for in-line interconnection with the intra-facility link;
   electrical circuitry coupled to the ports, the electrical circuitry provided with a single chip local oscillator integrated circuit for transforming and forwarding L-band data signals over the intra-facility link and a bypass path around the single chip local oscillator integrated circuit for at least direct current and a reference signal; and
   a switching means to specify operations performed by the electrical circuitry to transform the multiplexed signal frequencies and voltages according to predetermined parameters compatible between the outdoor unit and the indoor unit.

2. The interoperability module of claim 1, wherein the bypass path is provided with a cut-off and an oscillator; the cut-off and oscillator configurable, according to the operations specified by the switching means, to block the reference signal from the indoor unit and insert a substitute reference signal from the oscillator into the multiplexed signal to the outdoor unit.

3. The interoperability module of claim 1, further including a microcontroller coupled to the switching means and the single chip local oscillator integrated circuit; the microcontroller controlling the single chip local oscillator integrated circuit according to inputs to the switching means.

4. The interoperability module of claim 3, wherein the microcontroller control of the single chip local oscillator integrated circuit is via an I2C communications link.

5. The interoperability module of claim 1, wherein the L-band data signals are isolated from the bypass path by low pass filters coupled to the intra-facility link.

6. The interoperability module of claim 1, wherein the bypass path is further divided into a power supply path and a reference signal path; the power supply path and the reference signal path arranged in parallel.

7. The interoperability module of claim 6, wherein a band stop filter is provided at each side of the power supply path to prevent passage of the reference signal along the power supply path.

8. The interoperability module of claim 1, further including a frequency doubler coupled to the bypass path and a reference input of the single chip local oscillator integrated circuit.

9. The interoperability module of claim 1, further including a modulator coupled to the bypass path; the modulator providing a control signal for the outdoor unit.

10. The interoperability module of claim 1, further including a surge protection coupled to the bypass path.

11. The interoperability module of claim 1, further including a band pass filter coupled to each of an input and an output of an L-band data connection to the single chip local oscillator integrated circuit.

12. The interoperability module of claim 1, further including a precision attenuation arrangement coupled to each of an input and an output of an L-band data connection to the single chip local oscillator integrated circuit.

13. The interoperability module of claim 1, wherein the bypass path is further divided into a power supply path and a reference signal path; the power supply path supplying direct current to a power supply of the interoperability module and passing direct current to the outdoor unit.

14. The interoperability module of claim 1, further including a microcontroller coupled to the switching means and the single chip local oscillator integrated circuit; the microcontroller controlling the single chip local oscillator integrated circuit according to inputs to the switching means; the bypass path divided into a power supply path and a reference signal path; the power supply path supplying direct current to a power supply of the interoperability module and passing direct current to the outdoor unit; and the reference signal path is provided with a cut-off and an oscillator; the cut-off and oscillator configurable, according to the operations specified by the switching means, to block the reference signal from the indoor unit and insert a substitute reference signal from the oscillator into the multiplexed signal to the outdoor unit.

15. The interoperability module of claim 1, wherein the switching means includes a desired polarity and a desired operating band.

16. The interoperability module of claim 1, wherein the single chip local oscillator integrated circuit has a phase lock loop voltage controlled oscillator.

17. A satellite communications interoperability module for in-line insertion with an intra-facility link communicating a multiplexed signal between an outdoor unit and an indoor unit, comprising:
   ports for in-line interconnection with the intra-facility link;
   electrical circuitry coupled to the ports, the electrical circuitry provided with a single chip local oscillator integrated circuit for transforming and forwarding L-band data signals over the intra-facility link and a bypass path around the single chip local oscillator integrated circuit for at least direct current and a reference signal; and
   a plurality of switches selecting operations performed by the electrical circuitry to transform the multiplexed signal frequencies and voltages according to predetermined parameters compatible between the outdoor unit and the indoor unit.

18. The interoperability module of claim 17, further including a microcontroller coupled to the plurality of switches and the single chip local oscillator integrated circuit; the microcontroller controlling the single chip local oscillator integrated circuit according to the state of the plurality of switches.

19. The interoperability module of claim 17, further including a microcontroller coupled to the plurality of switches and the single chip local oscillator integrated circuit; the microcontroller controlling the single chip local oscillator integrated circuit according to the state of the plurality of switches; the bypass path divided into a power supply path and a reference signal path; the power supply path supplying direct current to a power supply of the interoperability module and passing direct current to the outdoor unit; and the reference signal path is provided with a cut-off and an oscillator; the cut-off and oscillator configurable, according to the state of the plurality of switches, to alternatively pass forward or to block the reference signal from the indoor unit and insert a substitute reference signal from the oscillator into the multiplexed signal to the outdoor unit.

20. The interoperability module of claim 17, wherein the single chip local oscillator integrated circuit has a phase lock loop voltage controlled oscillator.

* * * * *